(12) United States Patent
Michiyama et al.

(10) Patent No.: US 12,301,957 B2
(45) Date of Patent: May 13, 2025

(54) CONTROL METHOD, CONTENT MANAGEMENT SYSTEM, RECORDING MEDIUM, AND DATA STRUCTURE

(71) Applicant: Panasonic Intellectual Property Corporation of America, Torrance, CA (US)

(72) Inventors: Junji Michiyama, Fukuoka (JP); Junichiro Soeda, Nara (JP); Yuji Unagami, Osaka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 421 days.

(21) Appl. No.: 17/152,069

(22) Filed: Jan. 19, 2021

(65) Prior Publication Data
US 2021/0144451 A1 May 13, 2021

Related U.S. Application Data

(63) Continuation of application No. PCT/JP2019/041040, filed on Oct. 18, 2019.
(Continued)

(51) Int. Cl.
*H04N 21/8355* (2011.01)
*G06F 21/62* (2013.01)
(Continued)

(52) U.S. Cl.
CPC ..... *H04N 21/8355* (2013.01); *G06F 21/6209* (2013.01); *G06F 21/64* (2013.01);
(Continued)

(58) Field of Classification Search
CPC .......... H04N 21/8355; H04N 21/8358; H04N 5/913; H04N 2005/91335; H04N 21/2541;
(Continued)

(56) References Cited

U.S. PATENT DOCUMENTS 9,058,493 B1* 6/2015 Gouesbet ................ H04L 67/02
2013/0298151 A1* 11/2013 Leske .................... H04L 65/611
725/116

(Continued)

FOREIGN PATENT DOCUMENTS

CN 107145768 9/2017
CN 108462692 8/2018
(Continued)

OTHER PUBLICATIONS

International Search Report (ISR) issued on Jan. 21, 2020 in International (PCT) Application No. PCT/JP2019/041040.
(Continued)

*Primary Examiner* — Taghi T Arani
*Assistant Examiner* — Blake I Narramore
(74) *Attorney, Agent, or Firm* — Wenderoth, Lind & Ponack, L.L.P.

(57) ABSTRACT

The present disclosure provides a control method that is executed by one of a plurality of servers in a content management system that includes: the plurality of servers that own distributed ledgers; and a storing device that stores content, the control method including: acquiring transaction data that indicates that a providing device has provided content and includes at least identification information of the content provided by the providing device; and storing the transaction data acquired into the distributed ledgers of the plurality of servers.

11 Claims, 12 Drawing Sheets

Related U.S. Application Data

(60) Provisional application No. 62/748,618, filed on Oct. 22, 2018.

(51) Int. Cl.
*G06F 21/64* (2013.01)
*G06Q 20/12* (2012.01)
*H04L 9/00* (2022.01)
*H04L 9/06* (2006.01)
*H04N 21/8358* (2011.01)

(52) U.S. Cl.
CPC ....... *H04L 9/0643* (2013.01); *H04N 21/8358* (2013.01); *G06Q 20/123* (2013.01); *H04L 9/50* (2022.05)

(58) Field of Classification Search
CPC ......... H04N 21/2543; H04N 21/44008; H04N 21/632; G06F 21/6209; G06F 21/64; G06F 21/105; G06F 2221/2101; H04L 9/0643; H04L 9/50; H04L 9/3239; H04L 9/3247; G06Q 20/123; G06Q 20/02; G06Q 2220/00
See application file for complete search history.

(56) References Cited

U.S. PATENT DOCUMENTS

| | | | | |
|---|---|---|---|---|
| 2014/0026179 A1* | 1/2014 | Devarajan | ............... | G06F 21/51 726/1 |
| 2014/0173675 A1* | 6/2014 | Ahmed | ................... | H04L 67/02 725/116 |
| 2015/0067472 A1* | 3/2015 | Chen | ................... | G06F 16/9577 715/234 |
| 2016/0092988 A1* | 3/2016 | Letourneau | .......... | G06Q 20/223 705/66 |
| 2016/0171186 A1* | 6/2016 | Marking | ................. | G06F 21/10 713/189 |
| 2017/0249623 A1* | 8/2017 | Cole | ...................... | G06Q 20/29 |
| 2017/0330180 A1* | 11/2017 | Song | ................... | G06Q 20/401 |
| 2018/0025140 A1* | 1/2018 | Edelman | ............ | G06Q 20/4016 726/7 |
| 2018/0096121 A1* | 4/2018 | Goeringer | ............... | G06F 21/32 |
| 2018/0227293 A1* | 8/2018 | Uhr | ......................... | G06F 21/64 |
| 2018/0341670 A1* | 11/2018 | Young | .................. | H04W 4/185 |
| 2018/0352268 A1* | 12/2018 | O'Hanlon | ........... | H04N 21/233 |
| 2018/0374173 A1 | 12/2018 | Chen et al. | | |
| 2019/0129965 A1* | 5/2019 | Borkar | ................... | H04L 63/107 |
| 2019/0318348 A1* | 10/2019 | Brenner | ............... | G06Q 50/184 |
| 2019/0361992 A1* | 11/2019 | Kaguma | ............... | H04L 9/0637 |
| 2020/0327378 A1* | 10/2020 | Smith | .................... | G06N 5/048 |

FOREIGN PATENT DOCUMENTS

| | | |
|---|---|---|
| JP | 2013-207467 | 10/2013 |
| JP | 2016-162431 | 9/2016 |
| JP | 2016-208347 | 12/2016 |
| JP | 2017-204707 | 11/2017 |

OTHER PUBLICATIONS

Office Action issued Mar. 15, 2024 in corresponding Chinese Patent Application No. 201980049687.9, with partial English translation.

* cited by examiner

FIG. 5

| CONTENT ID | PROVIDER ID | HASH VALUE | PROVIDING DATE AND TIME | SIGNATURE |
|---|---|---|---|---|
| 001 | A | f12ad4019f1a23a45f67 | 2018/10/10 15:00:00 | [20] |

| CONTENT ID | PROVIDER ID | HASH VALUE | PROVIDING DATE AND TIME | SIGNATURE | VIOLATION INFORMATION | DETAILED INFORMATION |
|---|---|---|---|---|---|---|
| 020 | A | 87065b43b20a215eb320 | 2018/10/10 15:00:00 | [20] | UNAUTHORIZED COPY | MOVIE TITANIC HAS BEEN DETECTED BASED ON WATERMARK |

D2

CONTROL METHOD, CONTENT MANAGEMENT SYSTEM, RECORDING MEDIUM, AND DATA STRUCTURE

CROSS REFERENCE TO RELATED APPLICATIONS

This application is a U.S. continuation application of PCT International Patent Application Number PCT/JP2019/041040 filed on Oct. 18, 2019, claiming the benefit of priority of U.S. Provisional Patent Application No. 62/748,618 filed on Oct. 22, 2018, the entire contents of which are hereby incorporated by reference.

BACKGROUND

1. Technical Field

The present disclosure relates to a control method, a content management system, a recording medium, and a data structure.

2. Description of the Related Art

A technique for easily charging a fee for content exchanged over a peer-to-peer system is disclosed (see Japanese Unexamined Patent Application Publication No. 2016-162431).

SUMMARY

However, the technique is problematic in that the history of content provided is not appropriately managed.

In view of the above, the present disclosure provides a control method and the like, with which the history of content provided can be appropriately managed.

A control method according to one aspect of the present disclosure is a control method that is executed by one of a plurality of servers in a content management system that includes: the plurality of servers that own distributed ledgers; and a storing device that stores content, the control method including: acquiring transaction data that indicates that a providing device has provided content and includes at least identification information of the content provided by the providing device; and storing the transaction data acquired into the distributed ledgers of the plurality of servers.

Generic or specific aspects of the present disclosure may be implemented by a system, a device, an integrated circuit, a computer program or a computer readable recording medium such as a CD-ROM, or may be implemented by any combination of a system, a device, an integrated circuit, a computer program, and a recording medium.

With the control method according to the present disclosure, it is possible to appropriately manage the history of content provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is an illustrative diagram schematically showing transaction data according to the embodiment that indicates that authorized content has been provided;

FIG. 6 is an illustrative diagram schematically showing transaction data according to the embodiment that indicates that unauthorized content has been provided;

Figure 1:
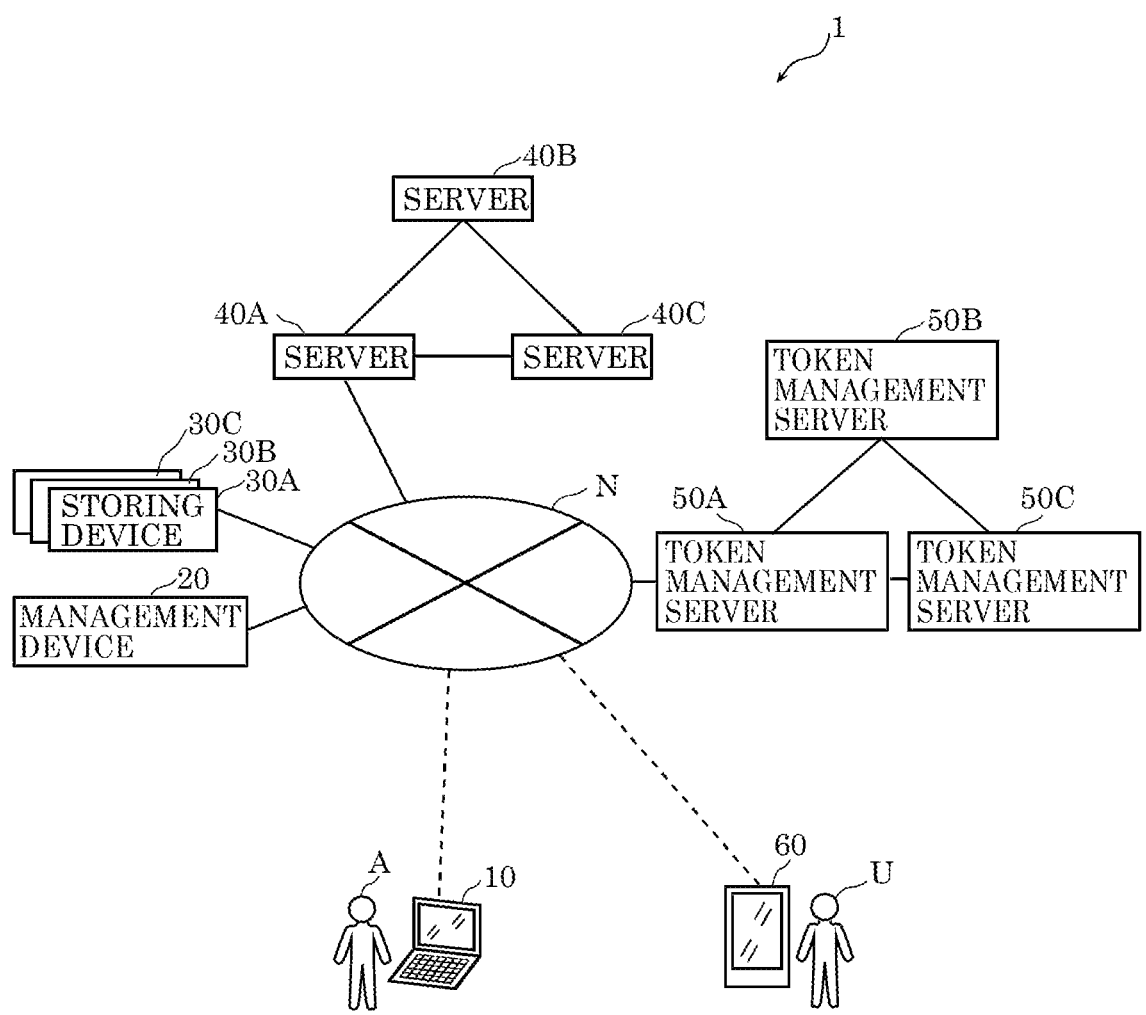
FIG. 1 is a block diagram schematically showing a configuration of a content management system according to an embodiment.

DETAILED DESCRIPTION OF THE EMBODIMENT (Underlying Knowledge Forming the Basis of the Present Disclosure)

The inventors of the invention of the present application found that the technique for charging a fee for content described in "background" section has the following problem.

A service is known in which a poster who posts content such as a moving image (or in other words, a poster who transmits content to a server) can earn revenue according to the number of times the content is reproduced. With such a service, a poster who provides more valuable content can gain more trust, and thus new content posted by the poster who has gained more trust is reproduced more often, as a result of which, the poster can gain even more trust and earn even more revenue.

Under the circumstances, for the purpose of impairing the trust or revenue of such a poster who has gained more trust, the history of content posted by the poster may be tampered. If such tampering is done, the trust or revenue of the poster is impaired, which leads to a loss in the opportunity of providing new valuable content.

On the other hand, an action of maliciously posting unauthorized content such as content generated by unauthorized copying so as to increase the number of times the unauthorized content is reproduced and improperly earn revenue may be attempted. Such an action goes against the purpose of distributing authorized and valuable content, and thus should be eliminated.

As described above, there is a problem in that the history of content provided is not appropriately managed.

In view of the above, the present disclosure provides a control method and the like, with which the history of content provided can be appropriately managed.

In order to solve the problem described above, a control method according to one aspect of the present disclosure is a control method that is executed by one of a plurality of servers in a content management system that includes: the plurality of servers that own distributed ledgers; and a storing device that stores content, the control method including: acquiring transaction data that indicates that a providing device has provided content and includes at least identification information of the content provided by the providing device; and storing the transaction data acquired into the distributed ledgers of the plurality of servers.

According to the above-described aspect, the server stores information that indicates the fact that the content was provided into the distributed ledgers as transaction data. At this time, the content is identified by the identification information that is stored together with the transaction data. Because it is substantially impossible to tamper with transaction data stored in distributed ledgers, the information that indicates the fact that the content was provided is appropriately managed without being tampered or deleted. Accordingly, with the control method according to the present disclosure, the history of content provided can be appropriately managed.

For example, the distributed ledgers may be constructed based on a blockchain.

According to the above-described aspect, the server can appropriately manage the history of content provided by using the distributed ledgers constructed based on a blockchain with more ease.

For example, in the acquiring of the transaction data, the transaction data that includes, together with the identification information of the content provided by the providing device, an attribute value of the content and date and time information indicating when the content was provided may be acquired.

According to the above-described aspect, the server further stores the attribute value of the content and the date and time when the content was provided into the distributed ledgers. Accordingly, the attribute value of the content and the date and time when the content was provided are also appropriately managed together with the identification information of the content, without being tampered or deleted. Accordingly, with the control method according to the present disclosure, the history of content provided can be appropriately managed.

For example, in the acquiring of the transaction data, the transaction data that further includes information indicating whether or not the content provided by the providing device includes a violation, the information being obtained as a result of determining whether or not the content provided by the providing device includes the violation after the providing device has provided the content, may be acquired.

According to the above-described aspect, the server further stores the information indicating whether or not the content includes a violation into the distributed ledgers. Accordingly, the information indicating whether or not the content includes a violation is also appropriately managed together with the identification information of the content, without being tampered or deleted. Accordingly, with the control method according to the present disclosure, the history of content provided can be appropriately managed.

For example, in the acquiring of the transaction data, when it is determined that the content provided by the providing device includes the violation, the transaction data that further includes detailed information of the violation of the content, the detailed information being obtained as a result of analyzing the violation of the content, may be acquired.

According to the above-described aspect, when it is determined that the content includes a violation, the server further stores detailed information indicating the details of the violation into the distributed ledgers. Accordingly, the detailed information indicating the details of the violation is appropriately managed together with the identification information of the content, without being tampered or deleted. Accordingly, with the control method according to the present disclosure, the history of content provided can be appropriately managed.

Also, a control method according to one aspect of the present disclosure is a control method that is executed by a content management system that includes: a plurality of servers that own distributed ledgers; and a storing device that stores content, the control method including: providing, by a providing device, content to the storing device; generating, by a management device, transaction data that indicates that the providing device has provided the content to the storing device and includes at least identification information of the content provided by the providing device; and acquiring and storing, by one of the plurality of servers, the transaction data into the distributed ledgers of the plurality of servers.

According to the above-described aspect, the content management system produces the same advantageous effects as those of the server described above.

For example, the distributed ledgers may be constructed based on a blockchain.

According to the above-described aspect, the content management system produces the same advantageous effects as those of the server described above.

For example, the management device may generate transaction data that includes, together with the identification information of the content provided by the providing device, an attribute value of the content and date and time information indicating when the content was provided.

According to the above-described aspect, the content management system produces the same advantageous effects as those of the server described above.

For example, after the providing device has provided the content, the management device may determine whether or not the content provided by the providing device includes a violation, and generate the transaction data that further includes information indicating whether or not the content provided by the providing device includes the violation, the information being obtained as a result of the determining.

According to the above-described aspect, the content management system produces the same advantageous effects as those of the server described above.

For example, when it is determined that the content provided by the providing device includes the violation, the management device may analyze the violation of the content, and generate the transaction data that further includes detailed information of the violation of the content, the detailed information being obtained as result of the analyzing.

According to the above-described aspect, the content management system produces the same advantageous effects as those of the server described above.

For example, the content management system may further include a token management server that manages transmission and reception of tokens. The token management server may determine whether or not a token has been provided from a user who provided the content by using the providing device to an administrator of the storing device. When it is determined that the token has not been provided, the providing device may inhibit the storing device from providing the content.

According to the above-described aspect, when the fact that the user who provided the content has paid a token to the administrator of the storing device is not confirmed, the content management system may inhibit the content from being provided from the providing device to the storing device. In other words, the content management system confirms that a token has been paid, and then permits the content to be provided from the providing device to the storing device. In this way, the user who provided content can pay reward for storing the content directly to the administrator of the storing device, or in other words, without using any intermediary. Accordingly, with the control method according to the present disclosure, the history of content provided can be appropriately managed while appropriately performing payment of reward for storing the content.

For example, the storing device may include a plurality of storing devices that operate independently of each other and are managed by different administrators.

According to the above-described aspect, the content management system can store the content in the plurality of storing devices in a distributed manner. In other words, the content management system does not necessarily require a storage device with a relatively large storage capacity, and can be constructed by using a plurality of storage devices with a relatively small storage capacity. Accordingly, with the control method according to the present disclosure, the history of content provided can be appropriately managed without requiring a storage device with a relatively large storage capacity.

For example, in the storing of the transaction data into the distributed ledgers of the plurality of servers, the transaction data may be stored after a consensus algorithm is executed by each of the plurality of servers.

According to the above-described aspect, the content management system stores the transaction data into the distributed ledgers after the consensus algorithm has been executed. Accordingly, by executing the consensus algorithm, whether or not to view the content can be appropriately managed with more ease.

Also, a content management system according to one aspect of the present disclosure is a content management system including: a plurality of servers that own distributed ledgers; a storing device that stores content, a providing device that provides content to the storing device; and a management device that generates transaction data that indicates that the providing device has provided the content to the storing device and includes at least identification information of the content provided by the providing device, wherein one of the plurality of servers acquires the transaction data and stores the transaction data acquired into the distributed ledgers of the plurality of servers.

According to the above-described aspect, the same advantageous effects as those of the control method described above can be produced.

Also, a recording medium according to one aspect of the present disclosure is a non-transitory computer-readable recording medium having a program recorded thereon, the program causing a computer to execute the control method described above.

According to the above-described aspect, the same advantageous effects as those of the control method described above can be produced.

Also, a data structure according to one aspect of the present disclosure is a data structure used in a content management system that includes a plurality of servers that own distributed ledgers, wherein the data structure is included in transaction data that is stored in the distributed ledgers, the transaction data includes: identification information that uniquely identifies content that is provided by a providing device to a storing device and is managed by the content management system; an attribute value of the content; date and time information indicating when the content was provided; and an electronic signature of a provider who provided the content by using the providing device.

According to the above-described aspect, the same advantageous effects as those of the content management system described above can be produced.

Generic or specific aspects of the present disclosure may be implemented by a system, a device, an integrated circuit, a computer program or a computer readable recording medium such as a CD-ROM, or may be implemented by any combination of a system, a device, an integrated circuit, a computer program, and a recording medium.

Hereinafter, an embodiment will be described specifically with reference to the drawings.

The embodiment described below shows a generic or specific example. The numerical values, shapes, materials, structural elements, the arrangement and connection of the structural elements, steps, the order of the steps, and the like shown in the following embodiment are merely examples, and therefore are not intended to limit the scope of the present disclosure. Accordingly, among the structural elements described in the following embodiment, structural elements not recited in any one of the independent claims are described as arbitrary structural elements.

Embodiment

In the present embodiment, content management system 1 that appropriately manages a history of content provided, a control method thereof, and the like will be described.

FIG. 1 is a block diagram schematically showing a configuration of content management system 1 according to the present embodiment. As used herein, the term "content" may encompass various types of electronic data such as texts, images, moving images, and software programs (including application programs).

As shown in FIG. 1, content management system 1 includes providing device 10, management device 20, storing devices 30A, 30B, and 30C, servers 40A, 40B, and 40C, token management servers 50A, 50B, and 50C, and viewing device 60. The devices included in content management system 1 are communicably connected to each other via network N. Network N may be any type of communication line or communication network including, for example, the Internet, a cell phone carrier network, and the like. Storing devices 30A, 30B, and 30C may also be referred to as "storing devices 30A and the like". Servers 40A, 40B, and 40C may also be referred to as "servers 40A and the like". Token management servers 50A, 50B, and 50C may also be referred to as "token management servers 50A and the like".

Providing device 10 is a device that provides content that is to be managed by content management system 1. Providing device 10 transmits content to management device 20 via network N. Also, providing device 10 transmits transaction data (described later) indicating that the content has been provided to storing devices 30A and the like to server 40A via network N. It is assumed here that providing device 10 is owned by provider A. It can be said that the content is provided by providing device 10, or the content is provided by provider A.

Management device 20 is a device that manages the distribution of content in content management system 1. Management device 20 transmits the content provided by providing device 10 to any one of storing devices 30A and the like via network N so as to store the content into the storing device. Management device 20 also manages a list of content stored in storing devices 30A and the like. Upon receiving a content search request from user U or the like, management device 20 searches the list of content for a content item indicated by the content search request, and sends a response to user U. Management device 20 may provide, based on the history of content reproduced by user U and the list of content, content that is recommended for user U to view (recommended content) to user U.

Storing device 30A is a device in which the content provided by providing device 10 is stored. Storing device 30A receives the content provided from providing device 10 to management device 20, and stores the content therein. Also, storing device 30A transmits the content to viewing device 60 via network N upon receiving a content reproduction request from user U.

Storing devices 30B and 30C are devices that have the same function as that of storing device 30A, and operate independently of storing device 30A. It is envisaged that storing devices 30A and the like are managed by different administrators, respectively. All of the administrators of storing devices 30A and the like may be different, or some of the administrators may be the same. The number of storing devices 30A and the like is not limited to three as long as the number of storing devices 30A and the like is one or more. Also, storing devices 30A and the like may be communicably connected to each other, and connected via network N.

Server 40A is one of the plurality of servers 40A and the like that own distributed ledgers. In the distributed ledger of server 40A, transaction data indicating that providing device 10 has provided content to storing devices 30A and the like is stored. The distributed ledger may further include information indicating whether or not the content includes a violation.

Servers 40B and 40C are devices that have the same function as that of server 40A, and operate independently of server 40A. The number of servers 40A and the like is not limited to three as long as the number of servers 40A and the like is two or more. Also, servers 40A and the like may be communicably connected to each other, and connected via network N.

Token management server 50A is one of the plurality of token management servers 50A and the like that own distributed ledgers. In the distributed ledger of token management server 50A, transaction data indicating a history of tokens sent and received by each device of content management system 1 is stored. As used herein, the term "token" is a concept that corresponds to a virtual value.

Token management servers 50B and 50C are devices that have the function as that of token management server 50A, and operate independently of token management server 50A. The number of token management servers 50A and the like is not limited to three as long as the number of token management servers 50A and the like is two or more. Also, token management servers 50A and the like may be communicably connected to each other, and connected via network N.

Token management servers 50A and the like perform management such that, when providing device 10 provides content and the content is stored in storing device 30A or the like, a token is paid from provider A who provided the content to the administrator of storing device 30A or the like. The token means a reward for the administrator of storing device 30A or the like to store the content.

Also, token management servers 50A and the like perform management such that, when user U of viewing device 60 reproduces the content, a token is paid from user U to provider A who provided the content and the administrator of storing device 30A or the like. The token means a reward for the administrator of storing device 30A or the like to have stored the content as well as a reward for provider A to have provided the content.

Here, token management server 50A may be configured to determine whether or not a token has been paid from provider A who provided the content by using providing device 10 to the administrator of storing device 30A or the like, and if it is determined that a token has not been paid, inhibit providing device 10 from providing content to storing device 30A or the like.

Also, servers 40A to 40C and token management servers 50A to 50C may be the same. For example, servers 40A to 40C may have the function of token management servers 50A to 50C.

Viewing device 60 is a device that is used to view the content stored in storing devices 30A and the like. Viewing device 60 is, for example, an information terminal of user U. Upon receiving a content viewing request from user U, viewing device 60 sends, to management device 20 via network N, an inquiry about in which of storing devices 30A and the like, the content indicated by the content viewing request is stored, then, receives the content from one of storing devices 30A and the like that stores the content, and displays the content.

Hereinafter, the configurations of the devices included in content management system 1 will be described in detail.

Figure 2:
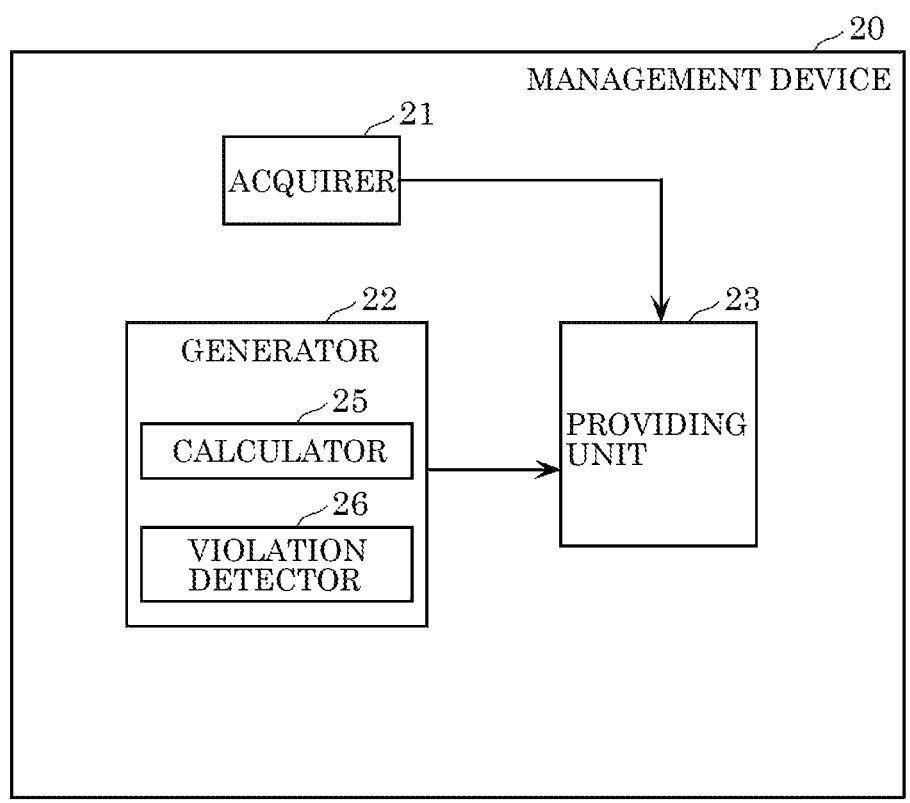
FIG. 2 is a block diagram schematically showing a configuration of a management device according to the embodiment.

FIG. 2 is a block diagram schematically showing a configuration of management device 20 according to the present embodiment.

As shown in FIG. 2, management device 20 includes acquirer 21, generator 22, and providing unit 23. The functional units of management device 20 may be implemented by, for example, a CPU executing a program by using a memory.

Acquirer 21 is a processing unit that acquires content. Acquirer 21 acquires content from providing device 10 via network N.

Generator 22 generates transaction data for the content acquired by acquirer 21, the transaction data indicating that the content has been provided by providing device 10. The transaction data generated by generator 22 includes at least identification information of the content. Also, the transaction data may further include an attribute value of the content and date and time information indicating the date and time when the content was provided.

Generator 22 includes calculator 25 and violation detector 26.

Calculator 25 is a processing unit that calculates the attribute value of the content. As used herein, the attribute value is a value for the attribute of the content, and with the attribute value, the data of the content can be identified. The attribute value may be, for example, a hash value calculated from the entire content data or a predetermined number of most significant bits (high-order bits), or a value calculated by other calculation methods. Here, an example will be described in which a hash value of the data of the content is used as the attribute value. The attribute value calculated by calculator 25 is incorporated into the transaction data generated by generator 22.

Violation detector 26 is a processing unit that detects unauthorized content. Violation detector 26 acquires the content acquired by acquirer 21, and performs processing of determining whether or not the content acquired by acquirer 21 is unauthorized content (the processing may also be referred to as "violation detection processing"). The expression "to detect unauthorized content" may also be expressed as "to detect a violation of the content".

As the method for detecting unauthorized content performed by violation detector 26, various techniques can be used. For example, a method may be used in which if a watermark attached to the images or audio of authorized content is detected from target content, the target content is determined as unauthorized content. Another method may be used in which, if the hash value of target content matches the hash value of authorized content, the target content is determined as unauthorized content. Also, as the method for detecting a violation of the content performed by violation detector 26, a method may be used in which a violation of target content is detected by visually comparing target content with unauthorized content or authorized content.

Violation detector 26 generates, based on the result of detection, information indicating whether the content acquired by acquirer 21 is authorized content or unauthorized content. Generator 22 generates, based on the information generated by violation detector 26, information indicating whether or not the content includes a violation. This information may be incorporated into the transaction data generated by generator 22.

Furthermore, if it is determined that the content acquired by acquirer 21 includes a violation, violation detector 26 analyzes the content for a violation. Then, violation detector 26 generates detailed information regarding the violation of the content obtained as a result of analysis. The detailed information may be incorporated into the transaction data generated by generator 22.

As described above, the transaction data generated by generator 22 at least indicates that the content has been provided by providing device 10. If it is determined that the content includes a violation, the transaction data may further indicate that the content includes a violation. In this case, the transaction data may further indicate the details of the violation.

Providing unit 23 is a processing unit that provides the content acquired by acquirer 21 to storing devices 30A and the like. Providing unit 23 acquires the content acquired by acquirer 21, selects one of storing devices 30A and the like in which the content is to be stored, and transmits the content to the selected storing device.

Also, providing unit 23 transmits the transaction data generated by generator 22 to servers 40A and the like.

Figure 3:
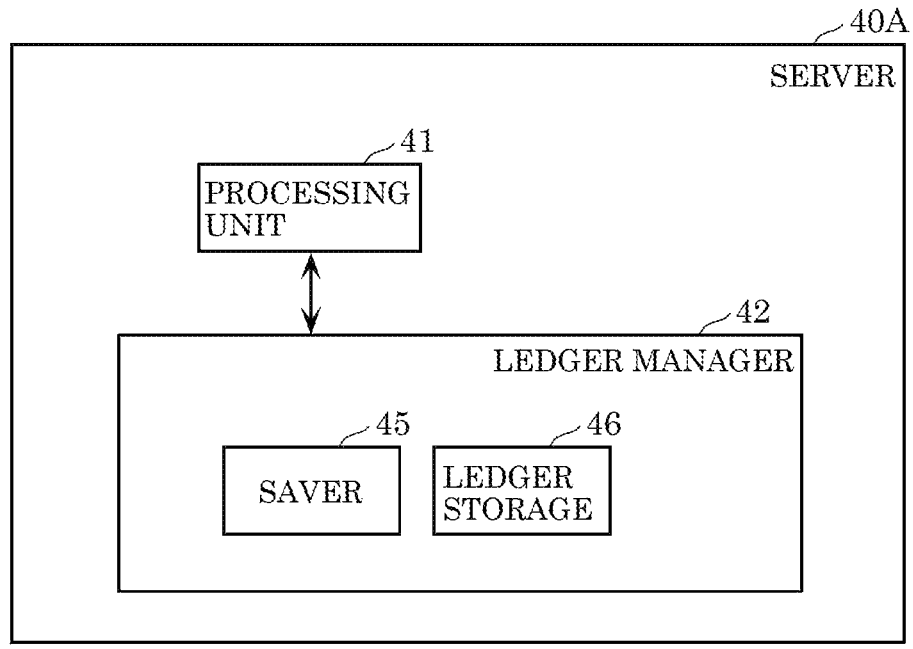
FIG. 3 is a block diagram schematically showing a configuration of a server according to the embodiment.

FIG. 3 is a block diagram schematically showing a configuration of server 40A according to the present embodiment.

As shown in FIG. 3, server 40A includes processing unit 41 and ledger manager 42. The functional units of server 40A may be implemented by, for example, a CPU executing a program by using a memory.

Processing unit 41 is a processing unit that manages various types of information using a distributed ledger.

Upon receiving transaction data from management device 20, processing unit 41 provides the received transaction data to ledger manager 42 so as to store the received transaction data into the distributed ledger.

Ledger manager 42 is a processing unit that manages the distributed ledger for content management. Ledger manager 42 stores the transaction data provided by processing unit 41 into the distributed ledger. In the distributed ledger, transaction data from the past to the present is stored.

Management is performed such that the transaction data is not tampered based on the characteristics that it is difficult to tamper with information recorded in distributed ledgers.

Ledger manager 42 includes saver 45 and ledger storage 46.

Saver 45 is a processing unit that stores new transaction data that needs to be stored in the distributed ledger into ledger storage 46. Saver 45 stores new transaction data into ledger storage 46 in a format that corresponds to the type of distributed ledger. Also, saver 45 transmits and receives communication data with savers 45 of servers other than server 40A so as to cause ledger storages 46 of other servers to store the new transaction data. For example, in the case where the distributed ledgers are constructed based on a blockchain, saver 45 generates a block including the new transaction data, synchronizes the generated block between servers 40A and the like, and stores the block into ledger storage 46.

Ledger storage 46 is a storage device in which a distributed ledger is stored. In the distributed ledger stored in ledger storage 46, one or more transaction data are stored, and management is performed such that it is difficult to tamper with the data by using characteristic values such as hash values (described later).

An example will be described in which the distributed ledgers are constructed based on, for example, a blockchain, but it is also possible to use another type of distributed ledgers (for example, IOTA, hash graph, or the like). The distributed ledgers may or may not execute a consensus algorithm (for example, PBFT (Practical Byzantine Fault Tolerance), PoW (Proof of Work), or PoS (Proof of Stake)) when storing new data. Hyperledger fabric is an example of distributed ledger technology that does not execute a consensus algorithm.

Alternatively, a configuration may be used in which, upon receiving transaction data, it is checked whether the signature contained in the received transaction data is an authorized signature. If it is determined that the signature is an authorized signature, the transaction data is stored in the ledger storage, transmitted to other servers, and synchronized.

Figure 4:
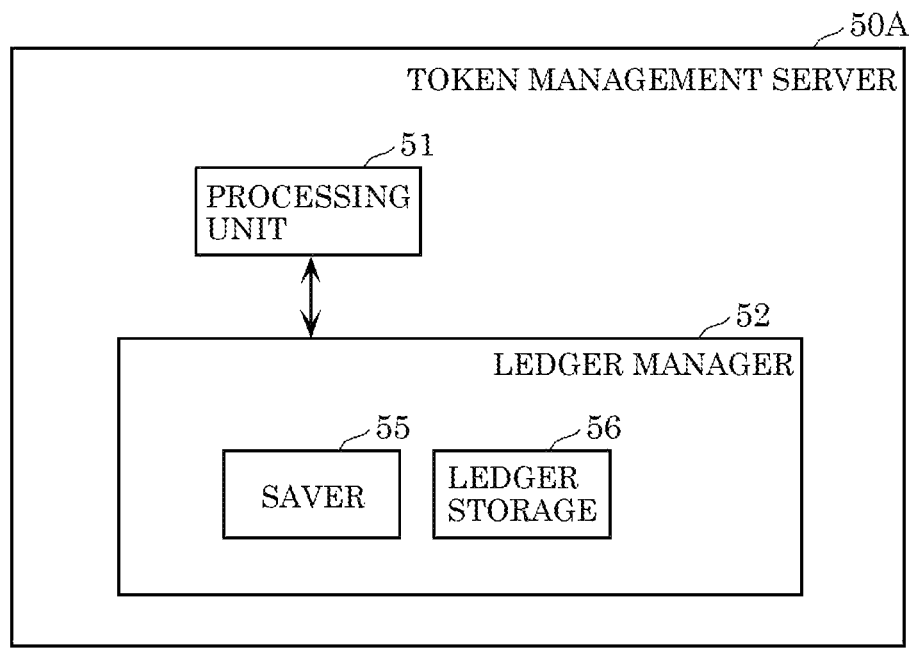
FIG. 4 is a block diagram schematically showing a configuration of a token management server according to the embodiment.

FIG. 4 is a block diagram schematically showing a configuration of token management server 50A according to the present embodiment.

As shown in FIG. 4, token management server 50A includes processing unit 51 and ledger manager 52. The functional units of token management server 50A may be implemented by, for example, a CPU executing a program by using a memory.

Processing unit 51 is a processing unit that manages various types of information using a distributed ledger. When transaction data regarding transmission and reception of a token is received from one of the devices included in content management system 1, processing unit 51 provides the received transaction data to ledger manager 52 so as to store the received transaction data into the distributed ledger.

Ledger manager 52 is a processing unit that manages the distributed ledger for managing the transmission and reception of tokens. Ledger manager 52 stores the transaction data provided by processing unit 51 into the distributed ledger. In the distributed ledger, transaction data from the past to the present is stored. Management is performed such that the transaction data is not tampered based on the characteristics that it is difficult to tamper with information recorded in distributed ledgers.

Ledger manager 52 includes saver 55 and ledger storage 56.

Saver 55 is a processing unit that stores new transaction data that needs to be stored in the distributed ledger into ledger storage 56. Saver 55 has the same configuration as that of saver 45 of server 40A.

Ledger storage 56 is a storage device in which a distributed ledger is stored. Ledger storage 56 has the same configuration as that of ledger storage 46 of server 40A.

FIG. 5 is a block diagram schematically showing transaction data D1 of the present embodiment that indicates that authorized content has been provided. Transaction data D1 is an example of transaction data that is generated by generator 22 of management device 20 and stored in the distributed ledger of server 40A or the like.

Transaction data D1 shown in FIG. 5 includes content ID, provider ID, hash value, providing date and time, and signature.

Content ID is an identifier for identifying content that is provided from providing device 10 and stored in storing devices 30A and the like.

Provider ID is an identifier for identifying a provider who provided the content.

Hash value is a hash value that corresponds to data of the content.

Providing date and time is information indicating the date and time when the content was provided.

Signature is an electronic signature attached by a device or a person that generated the transaction data.

Transaction data D1 shown in FIG. 5 is transaction data indicating that content that has a content ID of 001 has been provided from providing device 10 to management device 20. Transaction data D1 indicates that the content was provided by provider A, the content has a hash value of f12ad4019f1a23a45f67, the date and time when the content was provided is 2018 Oct. 1015:00:00, and an electronic signature of management device 20 is attached as the signature.

FIG. 6 is a block diagram schematically showing transaction data D2 of the present embodiment that indicates that unauthorized content has been provided. Transaction data D2 is an example of transaction data that is generated by generator 22 of management device 20 and stored in the distributed ledger of server 40A or the like.

Transaction data D2 shown in FIG. 6 includes content ID, provider ID, hash value, providing date and time, violation information, detailed information, and signature.

Content ID, provider ID, hash value, providing date and time, and signature are the same as those of transaction data D1.

Violation information is information indicating the result of violation detection performed on the content.

Detailed information is information indicating, in the case where the content includes a violation, the details of the violation.

Transaction data D2 shown in FIG. 6 is transaction data indicating that content that has a content ID of 020 has been provided from providing device 10 to management device 20. Transaction data D2 indicates that the content was provided by provider A, the content has a hash value of 87065b43b20a215eb320, the date and time when the content was provided is 2018 Oct. 10 15:00:00, and an electronic signature of management device 20 is attached as the signature. Transaction data D2 also includes information indicating that the violation information is "unauthorized copy", and that the content is an unauthorized copy of the movie Titanic and was detected based on a watermark, as the detailed information.

Transaction data D2 shown in FIG. 6 is content provided by providing device 10 to storing device 30A, and it can be said that transaction data D2 has a data structure that includes identification information that uniquely identifies content managed by content management system 1, an attribute value of the content, information indicating the date and time when the content was provided, and an electronic signature of the provider who provided the content by using providing device 10.

A description of processing performed in content management system 1 configured as described above will be given below.

Figure 7:
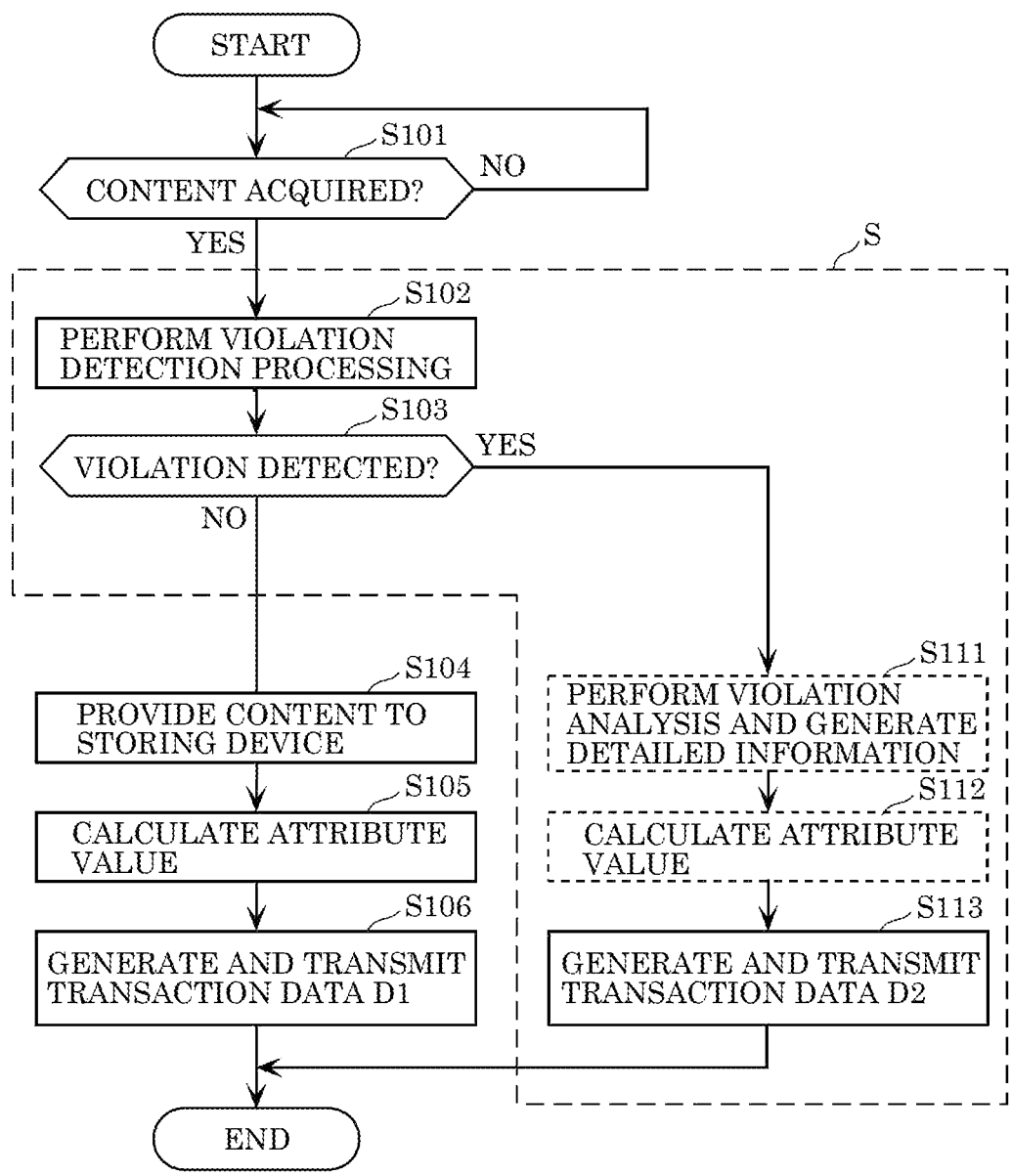
FIG. 7 is a flow diagram showing processing performed by the management device according to the embodiment.

FIG. 7 is a flow diagram illustrating processing performed by management device 20 according to the present embodiment.

As shown in FIG. 7, in step S101, acquirer 21 determines whether or not content has been acquired from providing device 10. If it is determined that content has been acquired (Yes in step S101), step S102 is performed. Otherwise (No in step S10), step S101 is performed again. That is, acquirer 21 waits in step S101 for acquirer 21 to acquire content.

In step S102, violation detector 26 performs violation detection processing on the content acquired in step S101.

In step S103, management device 20 branches the processing depending on whether a violation was detected in the content in step S102 (or in other words, the content is unauthorized content) or a violation was not detected in step S102 (or in other words, the content is authorized content). If it is determined that a violation was detected in the content (Yes in step S103), the processing proceeds to step S111. Otherwise (No in step S103), the processing proceeds to step S104.

In step S104, providing unit 23 provides the content acquired in step S101 to storing device 30A or the like.

In step S105, calculator 25 calculates the attribute value of the content acquired in step S101.

In step S106, generator 22 generates transaction data indicating that the content acquired in step S101 has been provided to storing device 30A or the like, and providing unit 23 transmits the transaction data to server 40A.

In step S111, violation detector 26 performs violation analysis on the content acquired in step S101, and generates detailed information of a violation. The processing performed in step S111 is not a requirement.

In step S112, calculator 25 calculates the attribute value of the content acquired in step S101. The processing performed in step S112 is not a requirement.

In step S113, generator 22 generates transaction data indicating that the content was provided from providing device 10 in step S101, and providing unit 23 transmits the transaction data to server 40A. In the generated transaction data, detailed information of a violation is incorporated in the case where step S111 is performed. In the case where step S112 is performed, the attribute value of the content is incorporated.

After step S106 or step S113, the set of processing operations shown in FIG. 7 ends.

The processing (steps S102, S103, S111, S112, and S113) shown in box S in FIG. 7 may be omitted. In this case, for each content acquired in step S101, irrespective of whether the content is unauthorized content or authorized content, providing content to storing device 30A or the like (step S104), attribute value calculation (step S105), and transmission of transaction data (step S106) are performed.

Through the set of processing operations shown in FIG. 7, when content is provided from providing device 10, management device 20 stores information indicating the fact that the content was provided from providing device 10 in the distributed ledger of server 40A or the like so as to appropriately manage the content. Also, authorized content is stored in storing device 30A or the like.

Figure 8:
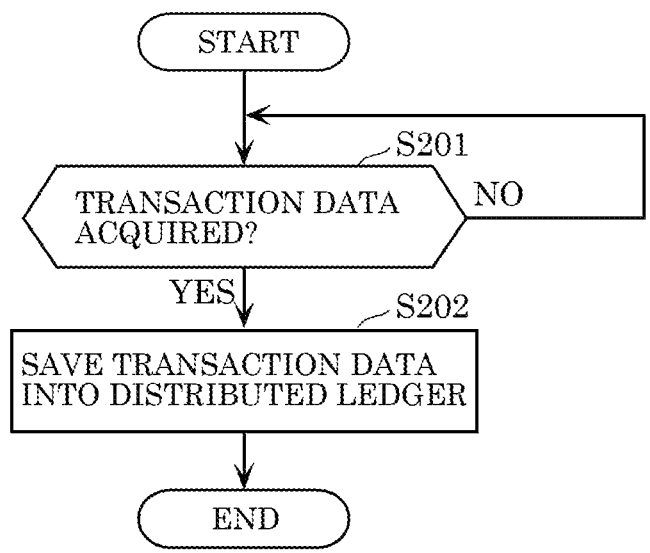
FIG. 8 is a flow diagram showing processing performed by the server according to the embodiment.

FIG. 8 is a flow diagram illustrating processing performed by server 40A according to the present embodiment.

As shown in FIG. 8, in step S201, processing unit 41 determines whether or not transaction data has been acquired from management device 20. The transaction data to be acquired is the transaction data provided by providing unit 23 of management device 20 in step S106 or S113. If it is determined that transaction data has been acquired (Yes in step S201), the processing proceeds to step S202. Otherwise (No in step S201), step S201 is performed. That is, processing unit 41 waits in step S201 for processing unit 41 to acquire transaction data.

In step S202, processing unit 41 provides the transaction data acquired in step S201 to ledger manager 42 so as to store the transaction data into the distributed ledger. Also, processing unit 41 transmits the transaction data to other servers 40B and the like so as to store the transaction data into the distributed ledgers of all of servers 40A and the like.

Through the set of processing operations shown in FIG. 8, information indicating the fact that the content was provided from providing device 10 is stored in the distributed ledgers of servers 40A and the like.

Hereinafter, overall processing performed in content management system 1 will be described.

Figure 9:
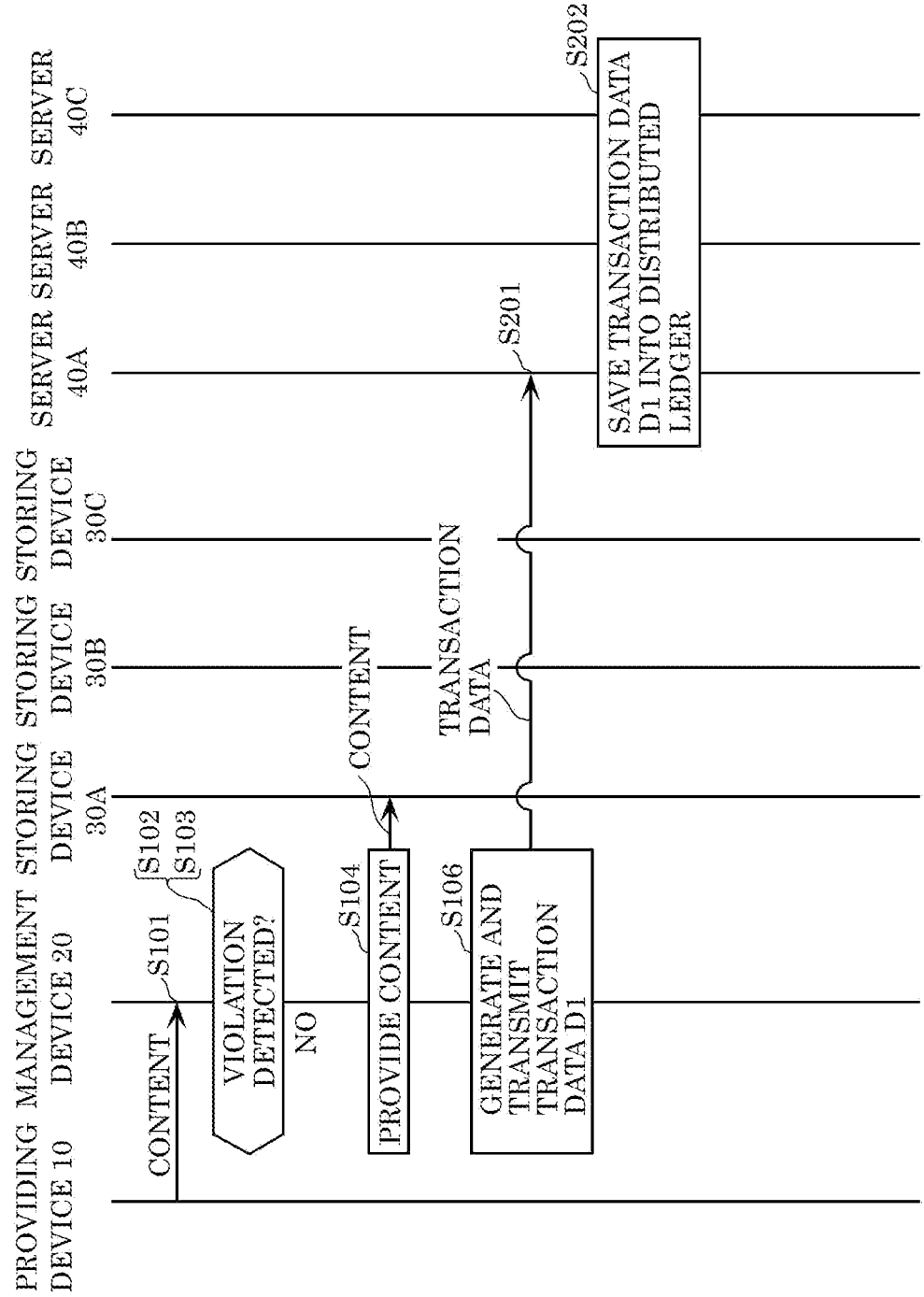
FIG. 9 is a sequence diagram showing overall processing performed in the content management system according to the embodiment when authorized content is provided.

FIG. 9 is a sequence diagram showing overall processing performed in content management system 1 according to the present embodiment when authorized content is provided. The processing steps that are the same as those shown in the flow diagrams of FIGS. 7 and 8 are given the same reference numerals as those used in FIGS. 7 and 8, and a detailed description thereof will be omitted.

When providing device 10 provides content to management device 20, management device 20 performs violation detection processing and determines that the content does not include a violation (or in other words, the content is authorized content) (No in steps S101 to S102, and S103).

Then, management device 20 provides the content to storing device 30A (step S104), also generates transaction data D1 indicating that authorized content has been provided, and transmits transaction data D1 to servers 40A and the like so as to store transaction data D1 in the distributed ledgers (steps S106 and S202).

Through the set of processing operations shown in FIG. 9, when authorized content is provided from providing device 10, the content is stored in storing device 30A or the like, and also information indicating the fact that the content was provided from providing device 10 is stored in the distributed ledgers of servers 40A and the like, and appropriately managed.

Figure 10:
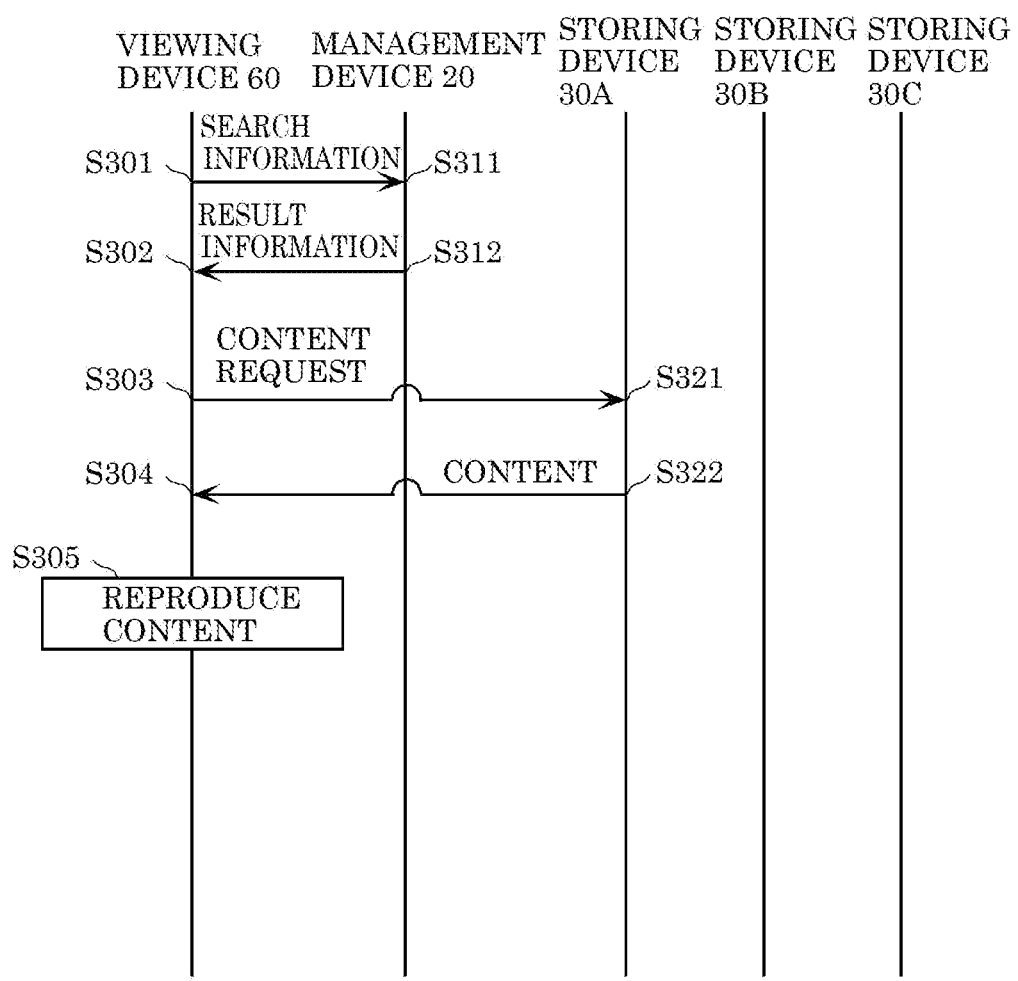
FIG. 10 is a sequence diagram showing overall processing performed in the content management system according to the embodiment when authorized content is reproduced.

FIG. 10 is a sequence diagram showing overall processing performed in content management system 1 according to the present embodiment when authorized content is reproduced.

First, in response to an operation performed by user U of viewing device 60, viewing device 60 transmits information for searching for content (also referred to as "search information") to management device 20 (step S301). The search information may be, for example, a group of one or more keywords. Management device 20 receives the search information (step S311).

Upon receiving the search information, management device 20 searches the content stored in storing devices 30A and the like based on the received search information, and transmits result information indicating the result of search to viewing device 60 (step S312). Viewing device 60 receives the result information (step S302). The result information may be, for example, an URL (Uniform Resource Locator) indicating the location of the searched content stored in storing device 30A or the like.

Upon receiving the result information, viewing device 60 transmits a content acquiring request to storing device 30A or the like, based on the result information (steps S303 and S321). Storing device 30A or the like that has received the content acquiring request transmits the requested content to viewing device 60 as a response to the request (steps S322 and S304).

Upon receiving the requested content, viewing device 60 reproduces the received content (S305).

Through the set of processing operations shown in FIG. 10, viewing device 60 acquires and reproduces authorized content that was provided from providing device 10 and stored in storing device 30A.

Figure 11:
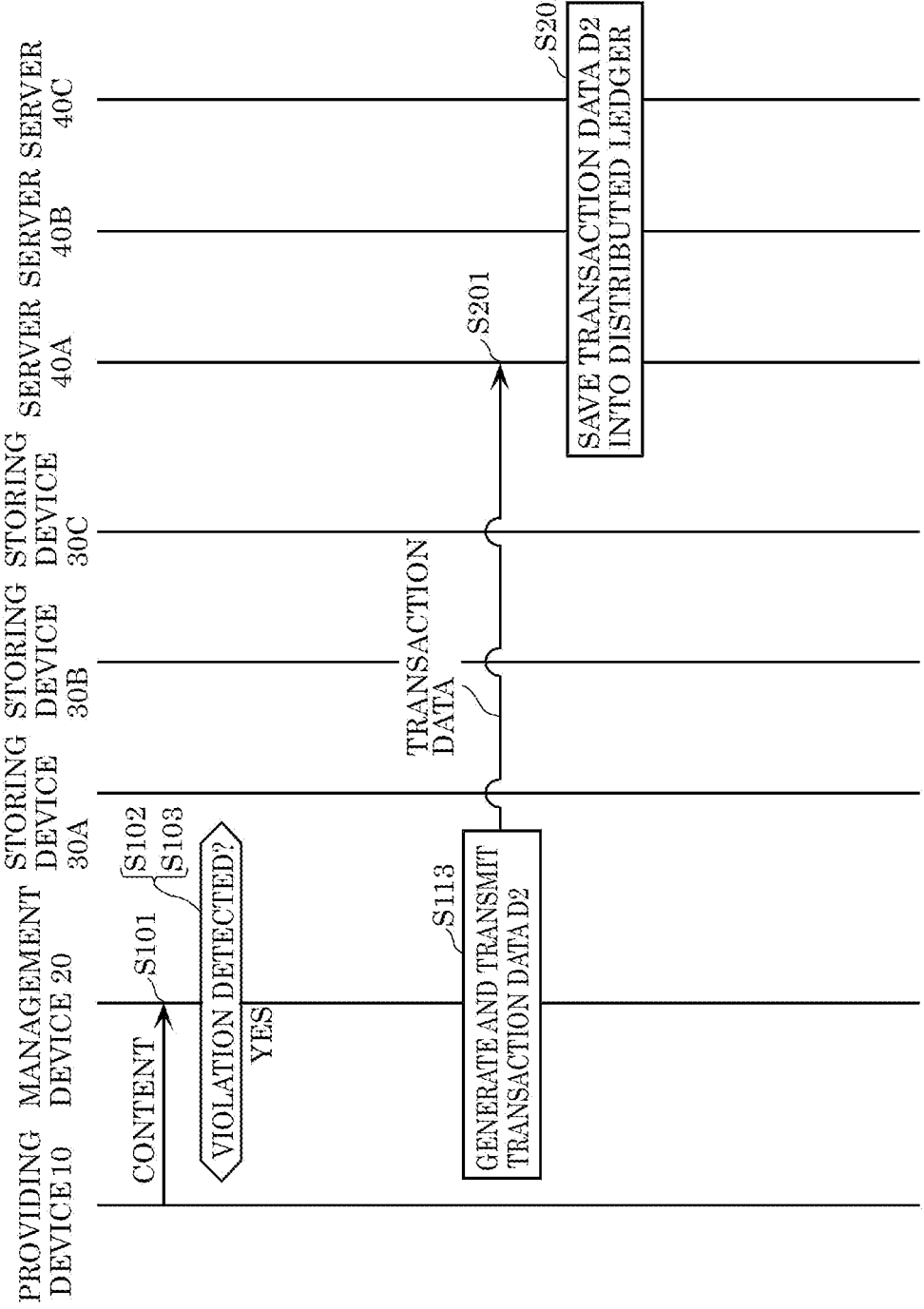
FIG. 11 is a sequence diagram showing overall processing performed in the content management system according to the embodiment when unauthorized content is provided.

FIG. 11 is a sequence diagram showing overall processing performed in content management system 1 according to the present embodiment when unauthorized content is provided. The processing steps that are the same as those shown in the flow diagram of FIGS. 7 and 8 are given the same reference numerals as those used in FIGS. 7 and 8, and a detailed description thereof will be omitted.

When providing device 10 provides content to management device 20, management device 20 performs violation detection processing and determines that the content includes a violation (or in other words, the content is unauthorized content) (Yes in steps S101 to S102, and S103).

Then, management device 20 generates transaction data D2 indicating that unauthorized content has been provided and transmits transaction data D2 to servers 40A and the like so as to store transaction data D2 into the distributed ledgers (steps S113 and S202).

Through the set of processing operations shown in FIG. 11, when unauthorized content is provided from providing device 10, information indicating the fact that unauthorized content was provided is stored in the distributed ledgers of servers 40A and the like, and appropriately managed.

A supplementary description of the blockchain used in the embodiment described above will be given.

Figure 12:
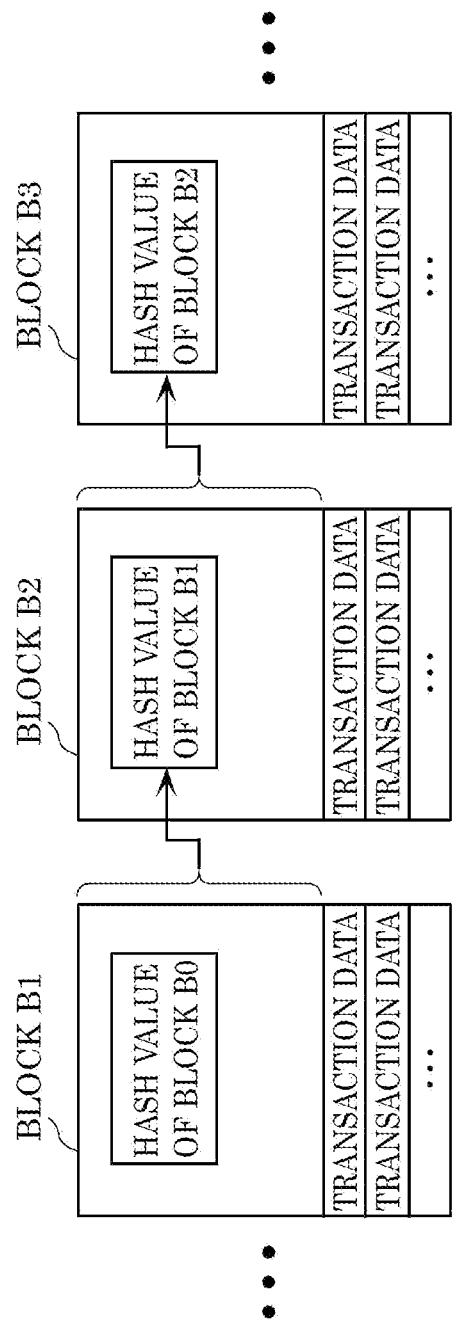
FIG. 12 is an illustrative diagram showing the data structure of a blockchain.

FIG. 12 is an illustrative diagram showing the data structure of a blockchain.

Blockchain is a structure in which blocks, which are recording units, are connected in the form of a chain. Each block includes a plurality of transaction data and the hash value of the immediately preceding block. Specifically, block B2 includes the hash value of B1 that is the preceding block of block B2. A hash value calculated from a plurality of transaction data that are included in block B2 and the hash value of block B1 is included in block B3 as the hash value of block B2. In this way, by connecting blocks in the form of a chain while including the transaction data and the like of the preceding block as a hash value, tampering of recorded transaction data can be effectively prevented.

If a change is made to transaction data in the past, the hash value of the block takes a value different from the value before the change is made. Accordingly, in order to make the tampered block appear to be a proper block, it is necessary to re-construct all of the subsequent blocks, which is practically very difficult to perform. By utilizing this property, blockchain is made tamper-proof.

Figure 13:
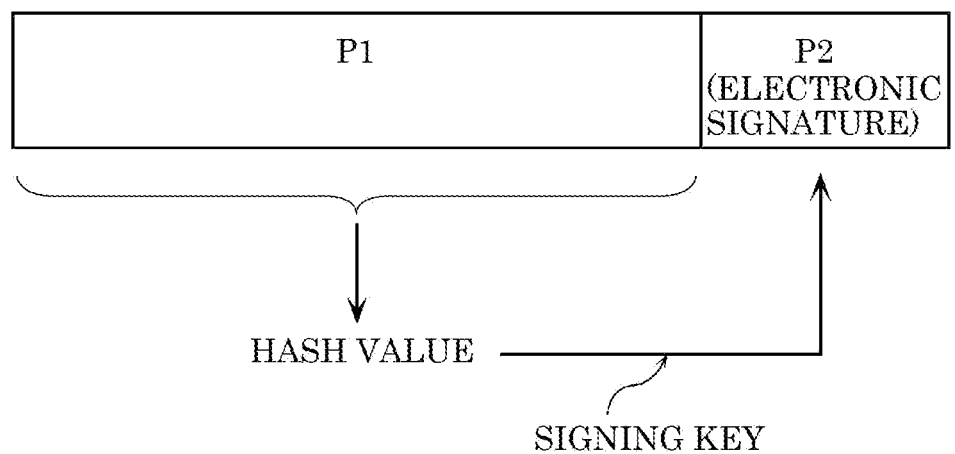
FIG. 13 is an illustrative diagram showing the data structure of transaction data.

FIG. 13 is an illustrative diagram showing the data structure of transaction data.

The transaction data shown in FIG. 13 includes main transaction data P1 and electronic signature P2. Main transaction data P1 is the main data contained in the transaction data. Electronic signature P2 is generated as a result of a creator of the transaction data signing the hash value of main transaction data P1 with a signing key, more specifically, by encrypting the data with a private key of the creator.

The transaction data includes electronic signature P2, and it is therefore substantially impossible to tamper with the transaction data. With this configuration, tampering of the main transaction data is prevented.

As described above, the server according to the present embodiment stores information that indicates the fact that content was provided into the distributed ledgers as transaction data. At this time, the content is identified by the identification information that is stored together with the transaction data. Because it is substantially impossible to tamper with transaction data stored in distributed ledgers, the information that indicates the fact that the content was provided is appropriately managed without being tampered or deleted. Accordingly, with the control method according to the present disclosure, the history of content provided can be appropriately managed.

Also, the server further stores the attribute value of the content and the date and time when the content was provided into the distributed ledgers. Accordingly, the attribute value of the content and the date and time when the content was provided are also appropriately managed together with the identification information of the content, without being tampered or deleted. Accordingly, with the control method according to the present disclosure, the history of content provided can be appropriately managed.

Also, the server further stores the information indicating whether or not the content includes a violation into the distributed ledgers. Accordingly, the information indicating whether or not the content includes a violation is also appropriately managed together with the identification information of the content, without being tampered or deleted. Accordingly, with the control method according to the present disclosure, the history of content provided can be appropriately managed.

Also, when it is determined that the content includes a violation, the server further stores detailed information indicating the details of the violation into the distributed ledgers. Accordingly, the detailed information indicating the details of the violation is appropriately managed together with the identification information of the content, without being tampered or deleted. Accordingly, with the control method according to the present disclosure, the history of content provided can be appropriately managed.

Also, when the fact that the user who provided the content has paid a token to the administrator of the storing device is not confirmed, the content management system inhibits the content from being provided from the providing device to the storing device. In other words, the content management system confirms that a token has been paid, and then permits the content to be provided from the providing device to the storing device. In this way, the user who provided content can pay reward for storing the content directly to the administrator of the storing device, or in other words, without using any intermediary. Accordingly, with the control method according to the present disclosure, the history of content provided can be appropriately managed while appropriately performing payment of reward for storing the content.

Also, the content management system can store the content in the plurality of storing devices in a distributed manner. In other words, the content management system does not necessarily require a storage device with a relatively large storage capacity, and can be constructed by using a plurality of storage devices with a relatively small storage capacity. Accordingly, with the control method according to the present disclosure, the history of content provided can be appropriately managed without requiring a storage device with a relatively large storage capacity.

Also, the content management system stores the transaction data into the distributed ledgers after the consensus algorithm has been executed. Accordingly, by executing the consensus algorithm, whether or not to view the content can be appropriately managed with more ease.

In the embodiment given above, the structural elements may be configured by using dedicated hardware, or may be implemented by executing a software program suitable for the structural elements. The structural elements may be implemented by a program executor such as a CPU or a processor reading and executing a software program recorded in a recording medium such as a hard disk or a semiconductor memory. Here, the software that implements the content management system and the like of the embodiment described above may be a program as described below.

Specifically, the program is a program that causes a computer to execute a control method that is executed by one of a plurality of servers in a content management system that includes: the plurality of servers that own distributed ledgers; and a storing device that stores content, the control method including: acquiring transaction data that indicates that a providing device has provided content and includes at least identification information of the content provided by the providing device; and storing the transaction data acquired into the distributed ledgers of the plurality of servers.

Up to here, the content management system and the like according to one or more aspects have been described above by way of the embodiment, but the present disclosure is not limited to the embodiment given above. Other embodiments obtained by making various modifications that can be conceived by a person having ordinary skill in the art to the above embodiment as well as embodiments constructed by combining structural elements of different embodiments without departing from the scope of the present disclosure may also be encompassed within the scope of the one or more aspects.

Although only some exemplary embodiments of the present disclosure have been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a content management system that appropriately manages a history of content provided.

What is claimed is:

1. A control method that is executed by a content management system comprising:
   providing, by a providing device, content to a storing device;
   generating, by a management device, transaction data that indicates that the providing device has provided the content to the storing device, the transaction data including at least (i) identification information which uniquely identifies the content provided by the providing device, (ii) an identifier for identifying a provider who provided the content, and (iii) an electronic signature of the management device that generated the transaction data; and
   acquiring and storing, by a server, the transaction data into distributed ledgers,
   wherein the content provided by the providing device includes at least one of text data, image data, moving image data, or a program,
   wherein the content management system further includes a token management server that manages transmission and reception of tokens,
   wherein the token management server determines whether or not a token has been paid from a user who provided the content by using the providing device to an administrator of the storing device,
   wherein, when it is determined that the token has not been paid, the providing device inhibits the storing device from providing the content, and
   wherein the token indicates a reward for the administrator of the storing device to store the content.

2. The control method according to claim 1,
   wherein the distributed ledgers are constructed based on a blockchain.

3. The control method according to claim 1,
   wherein the management device generates transaction data that includes, together with the identification information which uniquely identifies the content provided by the providing device, an attribute value of the content and date and time information indicating when the content was provided.

4. The control method according to claim 1,
   wherein, after the providing device has provided the content, the management device determines whether or not the content provided by the providing device includes a violation, and generates the transaction data that further includes information indicating whether or not the content provided by the providing device includes the violation, the information being obtained as a result of the determining.

5. The control method according to claim 4,
   wherein, when it is determined that the content provided by the providing device includes the violation, the management device analyzes the violation of the content, and generates the transaction data that further includes detailed information of the violation of the content, the detailed information being obtained as result of the analyzing.

6. The control method according to claim 1,
   wherein the storing device includes a plurality of storing devices that operate independently of each other and are managed by different administrators.

7. The control method according to claim 1,
   wherein, in the storing of the transaction data into the distributed ledgers of the plurality of servers,
   the transaction data is stored after a consensus algorithm is executed by each of the plurality of servers.

8. A non-transitory computer-readable recording medium having a program recorded thereon, the program causing a computer to execute the control method according to claim 6.

9. The control method according to claim 1, wherein:
   the management device is configured to:
   determine whether or not the content provided is authorized, and
   when determining that the content is authorized, generate the transaction data.

10. The control method according to claim 1, wherein:
    the content is different from the transaction data.

11. A content management system comprising:
    a computer including a processor and a memory having recorded thereon a program for being executed by the processor,
    wherein the computer generates transaction data that indicates that a providing device that provides content to a storing device has provided the content to the storing device, the transaction data including at least (i) identification information which uniquely identifies the content provided by the providing device, (ii) an identifier for identifying a provider who provided the content, and (iii) an electronic signature of the computer that generated the transaction data; and
    a server that acquires the transaction data and stores the transaction data acquired into distributed ledgers,
    wherein the content provided by the providing device includes at least one of text data, image data, moving image data, or a program,
    wherein the content management system further includes a token management server that manages transmission and reception of tokens,
    wherein the token management server determines whether or not a token has been paid from a user who provided the content by using the providing device to an administrator of the storing device,
    wherein, when it is determined that the token has not been paid, the providing device inhibits the storing device from providing the content, and
    wherein the token indicates a reward for the administrator of the storing device to store the content.

* * * * *